(12) United States Patent
Tang

(10) Patent No.: US 8,476,796 B2
(45) Date of Patent: Jul. 2, 2013

(54) BRUSHLESS DC MOTOR

(75) Inventor: Songfa Tang, Zhongshan (CN)

(73) Assignee: ZhongShan Broad-Ocean Motor Co., Ltd., Zhongshan (CN)

( * ) Notice: Subject to any disclaimer, the term of this patent is extended or adjusted under 35 U.S.C. 154(b) by 101 days.

(21) Appl. No.: 13/283,631

(22) Filed: Oct. 28, 2011

(65) Prior Publication Data

US 2012/0104903 A1   May 3, 2012

(30) Foreign Application Priority Data

Oct. 30, 2010   (CN) .................... 2010 2 0595366 U

(51) Int. Cl.
*H02K 11/00* (2006.01)

(52) U.S. Cl.
USPC ........................................ 310/68 B; 310/71

(58) Field of Classification Search
USPC ................. 310/68 B, 68 R, 216.114, 216.121
See application file for complete search history.

(56) References Cited

U.S. PATENT DOCUMENTS

| 4,952,830 | A * | 8/1990 | Shirakawa | 310/68 B |
| 5,148,070 | A * | 9/1992 | Frye et al. | 310/168 |
| 5,325,005 | A * | 6/1994 | Denk | 310/68 B |
| 6,522,130 | B1 * | 2/2003 | Lutz | 324/207.2 |
| 2005/0248306 | A1 * | 11/2005 | Chen et al. | 318/712 |
| 2006/0108881 | A1 * | 5/2006 | Hauger et al. | 310/68 B |

* cited by examiner

*Primary Examiner* — Tran Nguyen
*Assistant Examiner* — Naishadh Desai
(74) *Attorney, Agent, or Firm* — Matthias Scholl P.C.; Matthias Scholl

(57) ABSTRACT

A brushless DC motor including a casing, a stator assembly, a rotor assembly, a magnetic ring, and a circuit board with a Hall element. The stator assembly mounted in the casing and includes a stator core, a coil winding, and an end insulation plate. The rotor assembly includes a rotor core and a permanent magnet, and the end surface of the rotor core is coupled to a magnetic ring support. A convex support ring spaced apart from the permanent magnet is mounted on the edge of the magnetic ring support. The top of the convex support ring is sheathed with the magnetic ring and the Hall element extending out of the circuit board is located on the side of the magnetic ring. The motor minimizes the interference of the magnetic tile and improves measuring accuracy of the Hall element, all while having a simple structure, convenient mounting, and low costs.

8 Claims, 4 Drawing Sheets

BRUSHLESS DC MOTOR

CROSS-REFERENCE TO RELATED APPLICATIONS

Pursuant to 35 U.S.C. §119 and the Paris Convention Treaty, this application claims the benefit of Chinese Patent Application No. 201020595366.5 filed Oct. 30, 2010, the contents of which are incorporated herein by reference.

BACKGROUND OF THE INVENTION

1. Field of the Invention

The invention relates to a brushless DC motor with a Hall element.

2. Description of the Related Art

Conventional Hall-effect brushless DC Motors (BLDC Motors) include a stator on which a Hall plate is usually disposed to directly induce a main magnetic field and feed back the position signal of the rotor. The motors require a long magnetic tile and thus have high manufacturing costs. Another method to measure the position of a motor rotor is to directly mount a magnetic ring on the rotor to build a secondary magnetic field, through which the position of the magnetic ring is induced by a Hall element. However, disadvantage of the method is that because the magnetic ring is very close to the magnetic tile, the Hall element must be mounted inside a coil winding. In other words, the Hall element is enclosed by the coil winding; therefore current effects of the coil winding will affect the magnetic ring's secondary magnetic field, making it difficult for the Hall element to accurately measure the stator's position or resulting in inefficiency or even maloperations. Moreover, additional disadvantages may result from a complicated mounting structure and high costs.

SUMMARY OF THE INVENTION

In view of the above-described problems, it is one objective of the invention to provide a Hall-effect brushless DC motor that uses a convex support ring, spaced apart from a permanent magnet and mounted on the edge of a magnetic ring support of a rotor's end surface, to mount a magnetic ring. Such structure has the advantages of minimizing the interference of a magnetic tile in the magnetic ring and significantly improving measuring accuracy of a Hall element. Moreover, in addiction to a simple structure, it also has a convenient mounting procedure and low costs.

To achieve the above objective, in accordance with one embodiment of the invention, there provided is a Hall-effect brushless DC motor comprising a casing, a stator assembly, a rotor assembly, a magnetic ring, and a circuit board with a Hall element, wherein the stator assembly is mounted in the casing and comprises a stator core, a coil winding, and an end insulation plate; the rotor assembly comprises a rotor core and a permanent magnet, the end surface of the rotor core is coupled to a magnetic ring support, a convex support ring that is spaced apart from the permanent magnet is mounted on the edge of the magnetic ring support, the top of the convex support ring is sheathed with the magnetic ring and the Hall element extending out of the circuit board is located on the side of the magnetic ring.

In a class of this embodiment, the Hall element is located at outer side of the magnetic ring and meanwhile at an upper position or lower position of the coil winding in the axial direction.

In a class of this embodiment, a support column extends out of the end insulation plate for mounting a circuit board.

In a class of this embodiment, the rotor core comprises an inner core and an outer core, which are coupled together by a shock ring and a connecting pin. The connecting pin extends through the bottom surface of the magnetic ring support, and the bottom surface is pressed tightly against the end surface of the rotor core via a circlip.

In a class of this embodiment, the permanent magnet is mounted on the outer surface of the rotor core.

Advantages of the invention are summarized below: 1) the convex support ring, spaced apart from the permanent magnet and mounted on the edge of the magnetic ring support of the rotor's end surface, is employed to mount the magnetic ring, and the Hall element is either located at an upper position or lower position of the coil winding. Such structure has the advantages of minimizing the interference of the magnetic tile in the magnetic ring and significantly improving measuring accuracy of the Hall element. Moreover, in addiction to a simple structure, it also has a convenient mounting procedure and low costs; and 2) the rotor core comprises the inner core and the outer core, which are coupled together by the shock ring and the connecting pin. The connecting pin extends through the bottom surface of the magnetic ring support, and the bottom surface is pressed tightly against the end surface of the rotor core by the circlip. Such structure has the advantages of simplicity, stability, and low vibration noise.

DETAILED DESCRIPTION OF THE EMBODIMENTS

For further illustrating the invention, experiments detailing a Hall-effect brushless DC motor are described below. It should be noted that the following examples are intended to describe and not to limit the invention.

Figure 1:
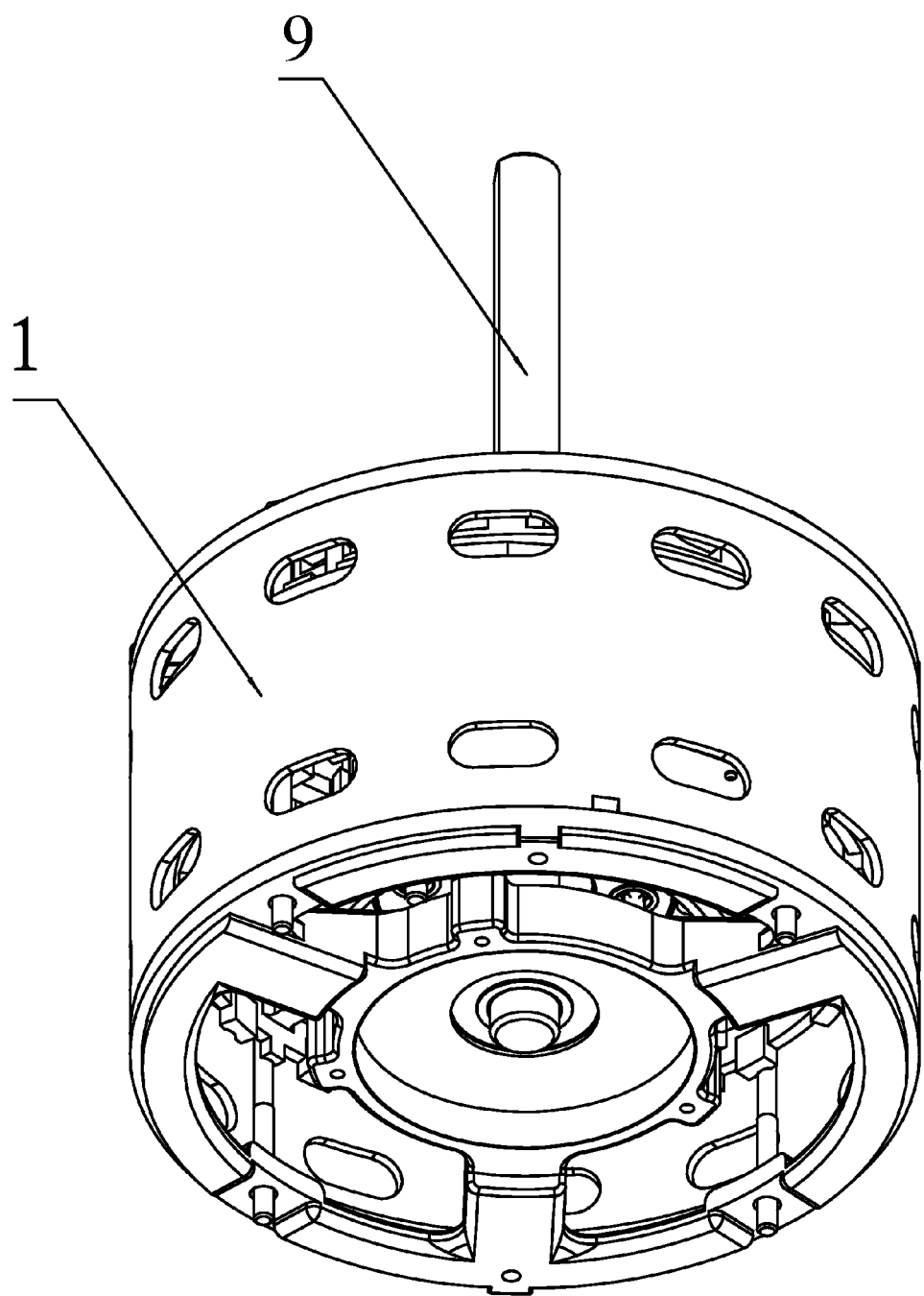
FIG. 1 is a three-dimensional diagram of a Hall-effect brushless DC motor according to one embodiment of the invention.
Figure 2:
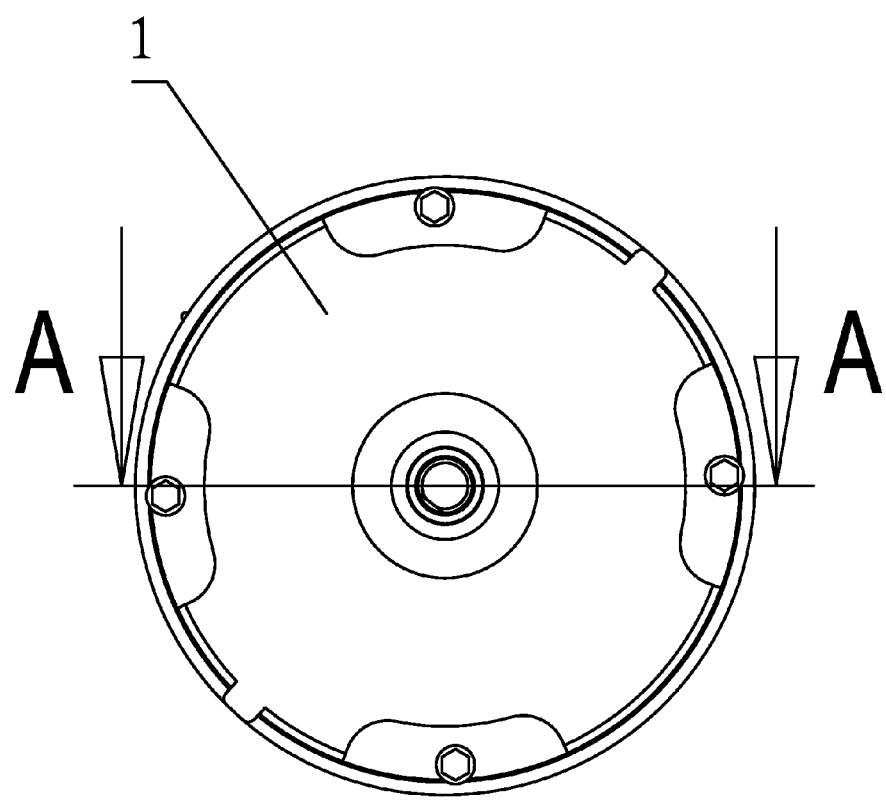
FIG. 2 is a top view of a Hall-effect brushless DC motor according to one embodiment of the invention.
Figure 3:
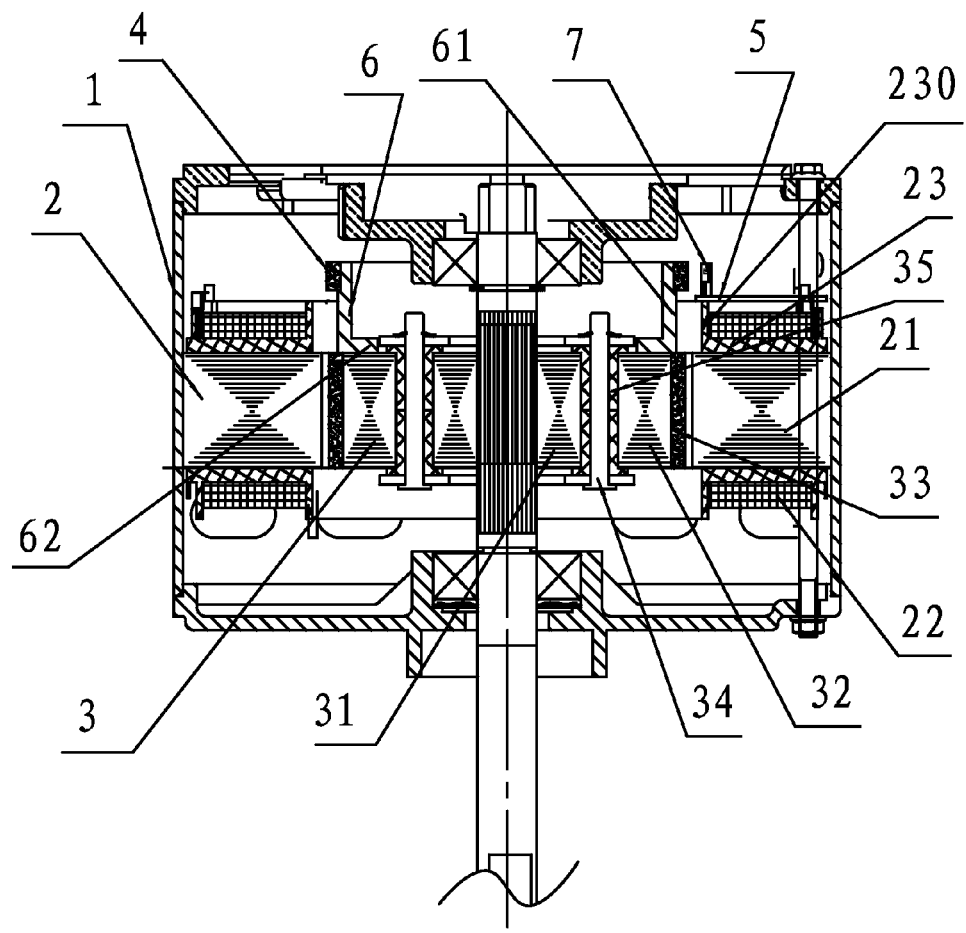
FIG. 3 is an A-A sectional view of FIG. 2.
Figure 4:
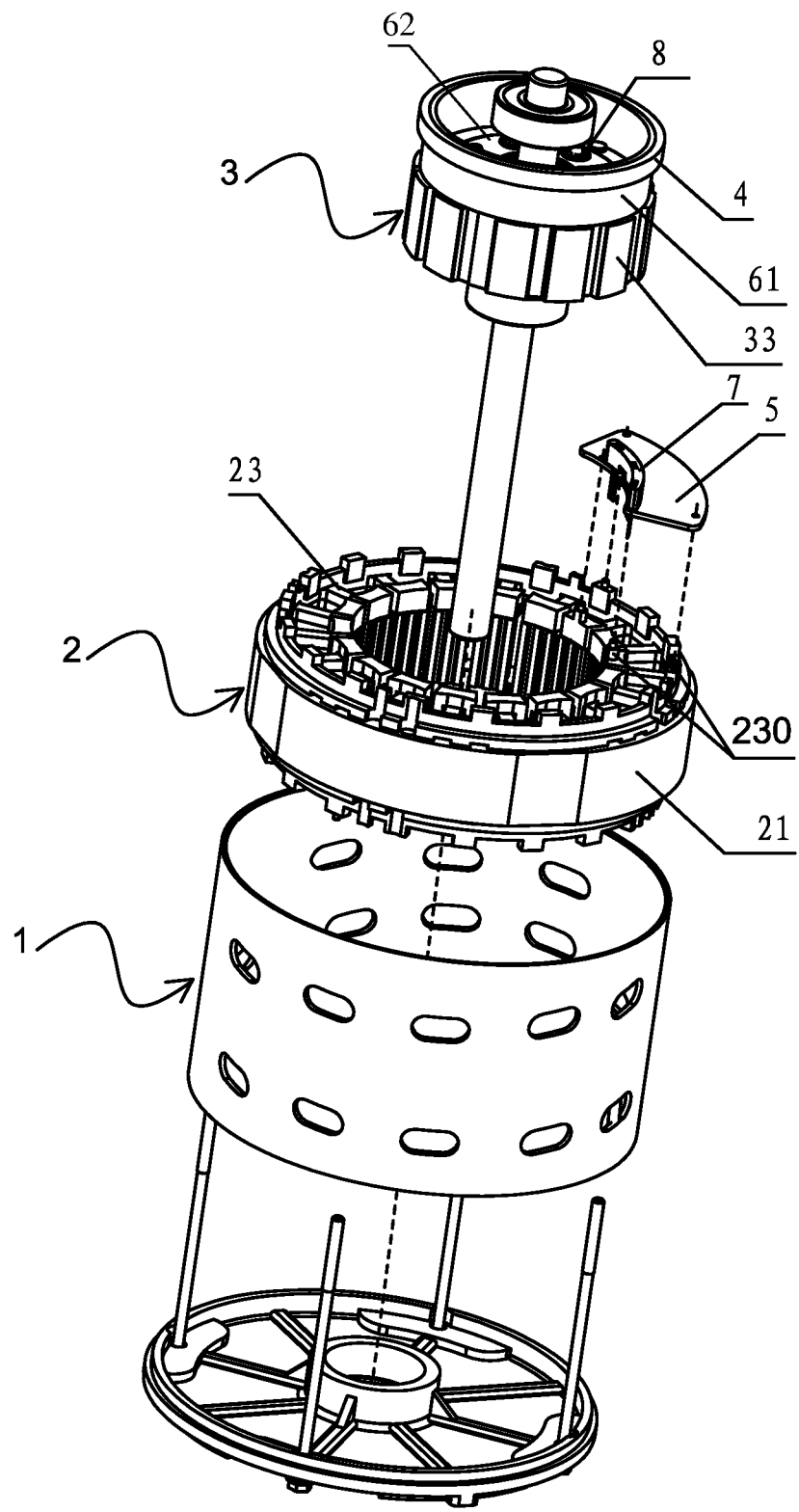
FIG. 4 is an exploded view of some parts of a Hall-effect brushless DC motor according to one embodiment of the invention.

As shown in FIGS. 1-4, a Hall-effect brushless DC motor comprises a casing 1, a stator assembly 2, a rotor assembly 3, a magnetic ring 4, and a circuit board 7 with a Hall element 5. The stator assembly 2 mounted in the casing 1 comprises a stator core 21, a coil winding 22, and an end insulation plate 23. The rotor assembly 3 comprises a rotor core, a permanent magnet 33 and a rotating shaft 9. The end surface of the rotor core is coupled to a magnetic ring support 6. A convex support ring 61 that is spaced apart from the permanent magnet 33 is mounted on the edge of the magnetic ring support 6. The top of the convex support ring 61 is sheathed with the magnetic ring 4 and the Hall element 5 extending out of the circuit board 7 is located on the side of the magnetic ring 4. The Hall element 5 is at an upper position or lower position of the coil winding 22 in the axial direction. A support column 230 extends from the end insulation plate 23 for mounting the circuit board 7. The rotor core comprises an inner core 31 and an outer core 32, which are coupled together by a shock ring 35 and a connecting pin 34. The connecting pin 34 extends through the bottom surface 62 of the magnetic ring support 6.

The bottom surface 62 is pressed tightly with the rotor core by a circlip 8. The permanent magnet 32 is mounted on the outer surface of the rotor core.

The Hall-effect brushless DC motor provided by the invention employs the convex support ring 61, spaced apart from the permanent magnet 33 and mounted on the edge of the magnetic ring support 6 of the end surface of the rotor assembly 3, to mount the magnetic ring 4, and the Hall element 5 is either located at an upper position or lower position of the coil winding 22. Such structure has advantages of minimizing the interference of the magnetic tile in the magnetic ring and significantly improving measuring accuracy of the Hall element. Moreover, in addiction to a simple structure, it also has a convenient mounting procedure and low costs.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A brushless DC motor, comprising:
   a) a casing;
   b) a stator assembly;
   c) a rotor assembly;
   d) a magnetic ring; and
   e) a circuit board with a Hall element;
   wherein
   said stator assembly is mounted in said casing and comprises a stator core, a coil winding, and an end insulation plate;
   said rotor assembly comprises a rotor core and a permanent magnet;
   an end surface of said rotor core is coupled to a magnetic ring support, and a convex support ring that is spaced apart from said permanent magnet is mounted on the edge of said magnetic ring support; and
   a top of said convex support ring is sheathed with said magnetic ring and said Hall element extends out of said circuit board and is located on the side of said magnetic ring.

2. The motor of claim 1, wherein said Hall element is located at outer side of said magnetic ring and at an upper position or lower position of said coil winding in an axial direction.

3. The motor of claim 1, wherein a support column extends out of said end insulation plate for mounting a circuit board.

4. The motor of claim 2, wherein a support column extends out of said end insulation plate for mounting a circuit board.

5. The motor of claim 1, wherein said rotor core comprises an inner core and an outer core; the inner core and outer core are coupled together by a shock ring and a connecting pin; said connecting pin extends through the bottom surface of said magnetic ring support, and said bottom surface is pressed tightly against said end surface of said rotor core via a circlip.

6. The motor of claim 2, wherein said rotor core comprises an inner core and an outer core; the inner core and outer core are coupled together by a shock ring and a connecting pin; said connecting pin extends through the bottom surface of said magnetic ring support, and said bottom surface is pressed tightly against said end surface of said rotor core via a circlip.

7. The motor of claim 1, wherein said permanent magnet is mounted on an outer surface of said rotor core.

8. The motor of claim 2, wherein said permanent magnet is mounted on an outer surface of said rotor core.

* * * * *